(No Model.) 2 Sheets—Sheet 1.
G. ROSQUIST.
BELT TIGHTENER.
No. 417,512. Patented Dec. 17, 1889.
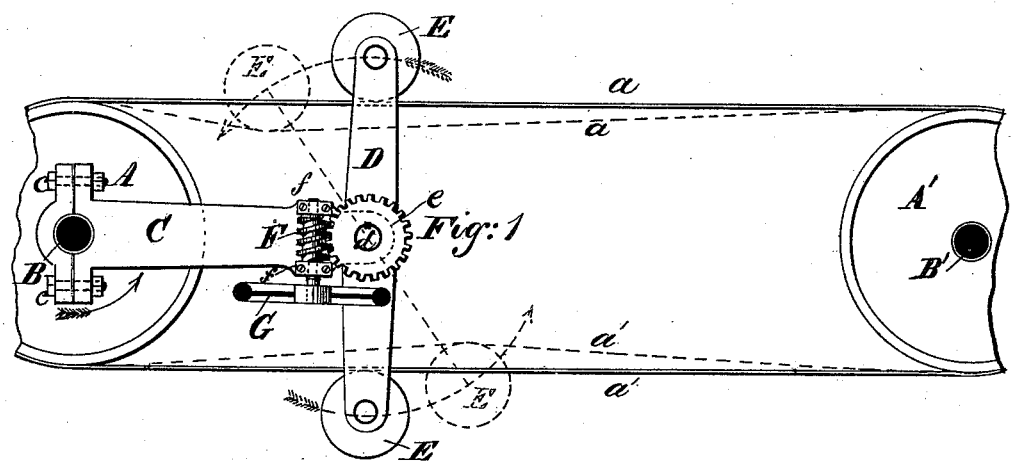
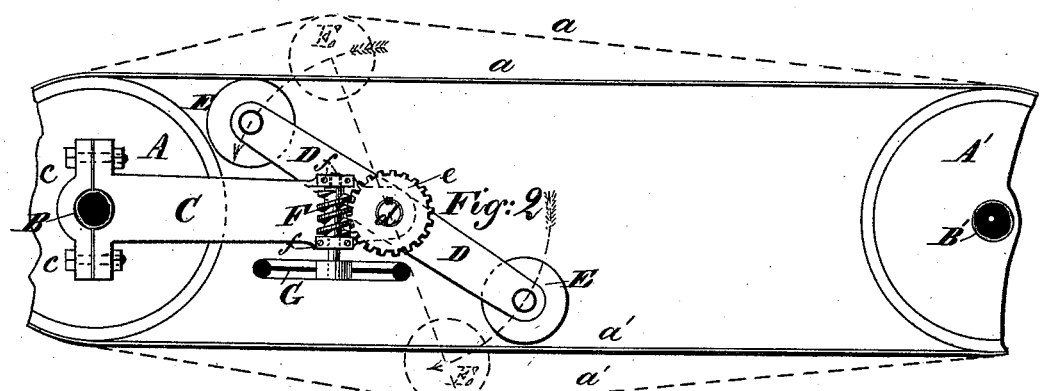
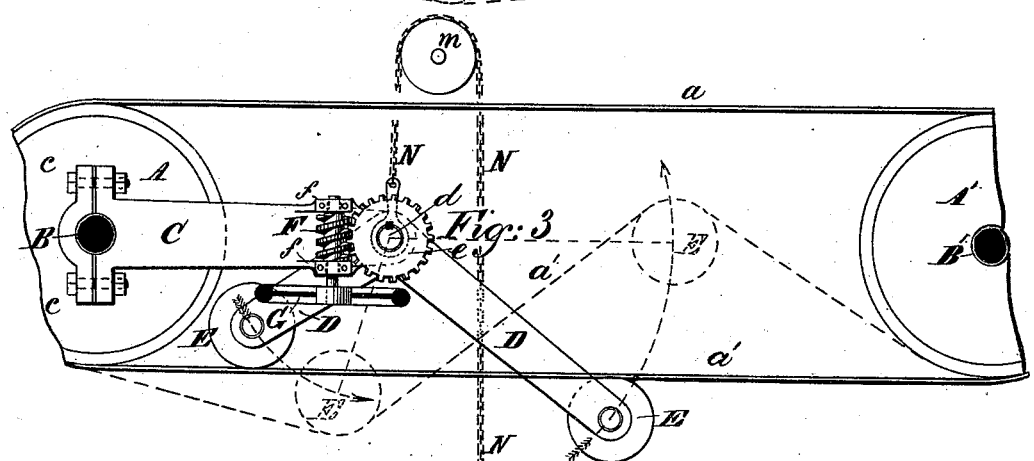
Witnesses:
Inventor
George Rosquist
By A. W. Almqvist
Attorney.

(No Model.) 2 Sheets—Sheet 2.
G. ROSQUIST.
BELT TIGHTENER.
No. 417,512. Patented Dec. 17, 1889.
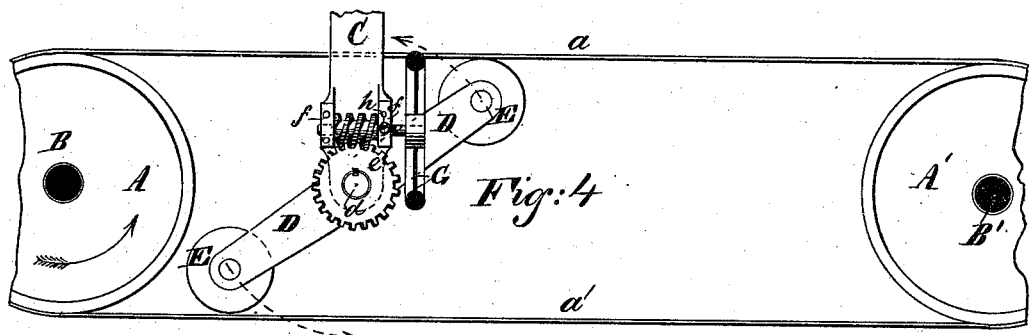
Fig: 4
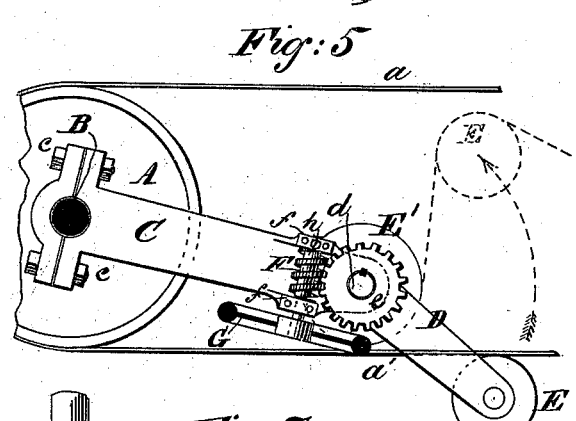
Fig: 5
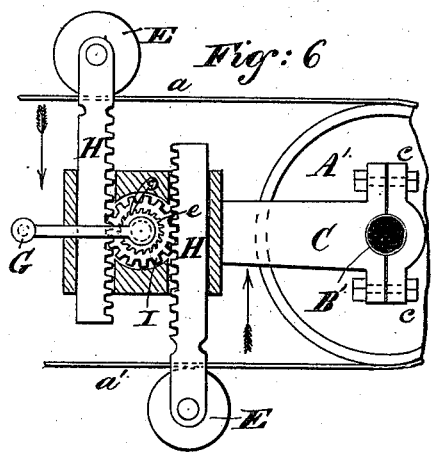
Fig: 6
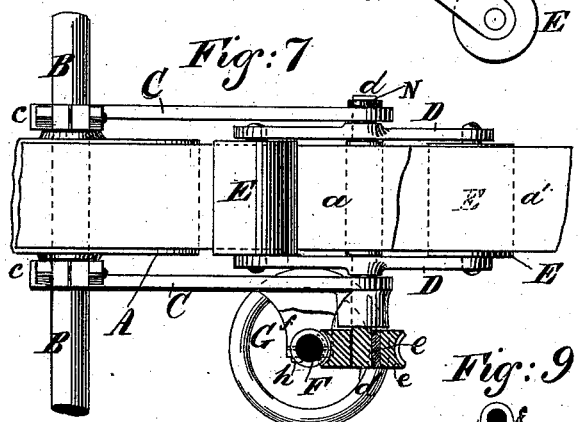
Fig: 7
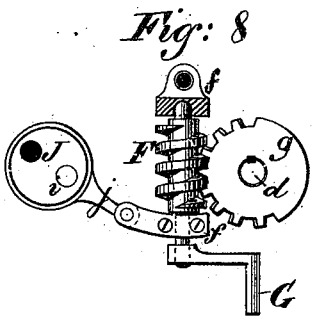
Fig: 8
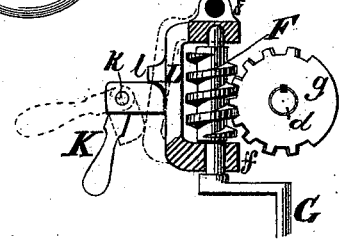
Fig: 9
Witnesses:
Hefmer Westeen.
T. H. Grossman.
Inventor
George Rosquist
By A. W. Almquist
Attorney

UNITED STATES PATENT OFFICE.

GEORGE ROSQUIST, OF BROOKLYN, NEW YORK.

BELT-TIGHTENER.

SPECIFICATION forming part of Letters Patent No. 417,512, dated December 17, 1889.

Application filed July 23, 1887. Serial No. 245,047. (No model.)

*To all whom it may concern:*

Be it known that I, GEORGE ROSQUIST, a citizen of the United States, and a resident of Brooklyn, in the county of Kings and State of New York, have invented a new and useful Improvement in Belt-Tighteners, of which the following is a specification.

My invention relates to belt-tighteners, by means of idlers or rollers applied upon the belt, and has for its object to provide a simple and effective device for tightening the grip of running belts on their pulleys, without the need of using rosin or printing-ink or other adhesive substance between the pulleys and the belts, and without necessitating the shortening and relacing of the belt to stretch it, and a device which occupies a very small space and is convenient to put up, may be operated just as easily when the belt is running at any speed as when it is still, and which is adapted for use on each one of a number of belts transmitting motion from one common shaft to separate machines or counter-shafts, in order that each of the same may be stopped, started, and run at any desired speed independently of the others, thus also obviating the frequent annoyance and delay heretofore experienced when, in order to stop one machine, a shaft has to be stopped which communicates motion to other machines, consequently stopping the motion of these latter.

The invention will be hereinafter fully described and claimed, reference being had to the accompanying two sheets of drawings, in which—

Figure 1 represents a side view of a belt and pulleys with my tightener applied to the same and tightening the grip by pulling the two running parts of the belt toward each other. Fig. 2 is a similar view of the same tightened by pressing the two running parts of the belt away from each other. Fig. 3 is a side view of the same arranged to tighten a belt by deflecting and stretching only one of the running parts. In Figs. 1, 2, and 3 the device is shown as attached to the shaft of one of the pulleys. Fig. 4 is a view operating like in Fig. 2, but showing a modification in the attachment, the tightening device being shown as when attached to a point outside of the shaft of one of the pulleys. Fig. 5 is a view similar to Fig. 3 of the most preferred modification of my belt-tightening device. Fig. 6 is a view of the device operating upon the two running parts of the belt, as in Fig. 1, but showing a modification of the gearing. Fig. 7 is a top view of the device when the rollers are placed in the dotted position shown in Fig. 1, showing the manner preferred, and common to all the previous figures, of supporting the belt-tightener at opposite sides of the belt by arms pivoted to the belt-shaft. Figs. 8 and 9 are detail views showing means for throwing out the gear, if desired, to instantly remove the pressure-grip and relax the belt.

The views of the drawings are shown as being horizontal; but it is evident that they may be just as well vertical, depending upon the location of shafts and machinery in a building where used. If vertical, the tightener is suspended from and supported entirely by the pulley-shaft. If horizontal, the main weight of the tightener will of course tend to bear on the belt, and should therefore be balanced by a weight, as shown in Fig. 3.

A is a pulley on the driving-shaft B, and A' a pulley on the counter-shaft B'. $a\ a'$ are the two parts of the belt running on the said pulleys. Of course it does not matter which of the shafts B B' is assumed to be the driving-shaft; but if it is B, as just stated, $a$ will be the most stretched part and $a'$ the slack part of the belt.

When the tightener is applied to only one of the parts of the belt, as in Figs. 3 and 5, it is preferably applied to the slack part $a'$.

Upon a fixed point, preferably one of the shafts—for instance B—I attach by a suitable bearing $c$ an arm C, and preferably two such arms—one at each side of the belt, as shown in Fig. 7. Two arms or levers D are secured to a shaft $d$, movable in bearings in the ends of the said arms C, and between the outer ends of the levers D are pivoted rollers or idlers E, which are pressed against the belt, as will presently appear, in order to tighten its grip upon the pulleys.

Upon one end of the shaft $d$ is keyed or otherwise secured a worm-wheel $e$, and adjacent to the same is fixed in suitable bearings $f$ upon the arm or other support C a screw, or so-called "worm," F in gear with the said worm-wheel $e$. The free end of the worm F is provided with a hand-wheel G, for operating it.

The operation of the device is readily understood by a glance at the drawings. The lever D will be moved so as to press the idlers E upon the belt or release them from the belt by turning the hand-wheel G, and consequently the worm F, in the corresponding direction.

In all the figures of the drawings except Figs. 7, 8, and 9 the lever D is shown in full lines in the position in which the idlers E exert no pressure upon the belt, and in dotted lines in Figs. 1, 2, 3, and 5 are shown positions of the lever and idlers corresponding to those in which the pressure is applied upon the belt to tighten its grip on the pulleys. If idlers are applied to both parts $a$ $a'$ of the belt, they should preferably be applied from the outside, as in Fig. 1, so as to move the parts of the belt toward each other, the arrangement of them between the two parts of the belt, as in Fig. 2, being liable to the objection that when the belt is tightened the parts $a$ $a'$ are spread apart, which consequently lessens the arc of the pulley in contact with the belt.

Best of all, I prefer the construction shown in Figs. 3 and 5, in which the tightener is applied to the slack part $a'$ of the belt, and of these constructions the simplest is that shown in Fig. 5, in which the lever D, carrying the idler E, extends at one side only of the shaft $d$, and the other idler (marked E' in Fig. 5) is mounted to run loosely directly on the shaft $d$.

In Fig. 6 is shown a modification of the gearing for operating the idlers, the latter being pivoted to toothed racks H, sliding in ways upon the arm C and operated by a pinion I, pivoted to the arm C between and in gear with the two racks simultaneously, with any approved stop—as a ratchet and pawl—to lock the parts in position; but the gear by worm and wheel, as before stated, is by far preferable, as it allows the belt to be tightened with great force by the application of very little power, and will retain the idlers in any position placed without a special stop, the threads in the worm itself acting as stops against the teeth of the wheel. However, to prevent any possible undue movement of the worm F, caused by a continued jar during the running of the belt, a set-screw $h$ is applied to the shaft of the worm through one of its bearings, as shown in Fig. 4.

In some cases, though not often, it may be desirable that the worm could be instantly thrown out of gear with the wheel, in order to instantly slacken the belt. In Figs. 8 and 9 two modifications of the manner of accomplishing this are shown, that shown in Fig. 9 being preferred. In both of these modifications the bearings $f$ of the worm are to be understood as separate from the arm C, (not shown,) one of them being supposed to be pivoted to it, so as to enable the worm to be swung toward or away from the worm-wheel $g$, in order to throw it in or out of gear respectively. In Fig. 8 this is shown as being done by means of an eccentric J, also to be understood as pivoted to arm C and connected by its strap $j$ to the lower worm-bearing, the eccentric being operated by an ordinary handle $i$.

In Fig. 9 the eccentric is replaced by a dog K, whose point $k$ is to be connected to the arm C, and which acts against a frame L, connecting the bearings $f$, a stop $l$ being cast upon the frame L to prevent the cam from being turned beyond the proper position of keeping the worm in gear. Of course the tightener may be applied to belts running in any direction, and frequently they are placed vertically, or nearly so, the shaft B being above the shaft B', in which case the parts of the belt-tightener are suspended from the shaft by means of the arm C without exerting any pressure by their own weight upon the belt; but if the belts run horizontally the tightening device should be counterbalanced—for instance, as shown in Fig. 3—by a weight M and a chain N, attached with one end to the said weight and with the other to the tightener and running over a stationary guide-pulley $m$, as shown in Fig. 3.

Having thus described my invention, what I claim as new, and desire to secure by Letters Patent, is—

1. In combination with a belt and its pulleys, an arm attached to a fixed support, idlers or rollers having supports connected with said arm, and gearing attached to said arm and roller-supports for shifting said rollers to tighten the belt, substantially as described.

2. In combination with a belt and its pulleys, an arm attached to a fixed support, a lever fulcrumed to the said arm and provided with idlers or rollers, and gearing attached to the said arm and lever for turning the latter to tighten the belt by the said idlers, substantially as set forth.

3. In combination with a belt and its pulleys, an arm attached to one of the pulley-shafts, a lever fulcrumed to the said arm and provided with idlers or rollers, and gearing attached to the said arm and lever for turning the latter to tighten the belt by the said idlers, substantially as set forth.

4. In combination with a belt and its pulleys, an arm attached to a fixed support, a lever fulcrumed to the said arm and provided with idlers or rollers, and a worm and worm-wheel meshing together and secured to the said arm and lever for turning the latter to tighten the belt by the said idlers, substantially as set forth.

5. In combination with a belt and its pulleys, an arm attached to one of the pulley-shafts, a lever fulcrumed to the said arm and provided with idlers or rollers, and a worm and worm-wheel meshing together and secured to the said arm and lever for turning the latter to tighten the belt by the said idlers, substantially as set forth.

6. In combination with a belt and its pulleys, a worm attached to a fixed support, a lever fulcrumed to the said support and provided with idlers or rollers, and a worm-wheel meshing together with said worm for turning the lever to tighten the belt by the said idlers, the bearing of the said worm being movable to throw the worm in and out of gear with the said worm-wheel, for the purpose specified.

7. In combination with a belt and its pulleys, a worm attached to a fixed support, a lever fulcrumed to the said support and provided with idlers or rollers, and a worm-wheel meshing together, the worm for turning the latter to tighten the belt by the said idlers, the bearing of the said worm being movable to throw the worm in and out of gear with the said worm-wheel and held in gear by a cam acting as stop against the said bearing, for the purpose specified.

8. In combination with a belt and its pulleys, an arm attached to a fixed support, a lever fulcrumed to the said arm and provided with idlers or rollers, and a worm and worm-wheel meshing together and secured to the said arm and lever for turning the latter to tighten the belt by the said idlers, the worm-bearing being provided with a set-screw $h$, acting as a stop against the worm-journal, for the purpose specified.

9. In combination with a belt and its pulleys, an arm attached to a fixed support, a lever fulcrumed to the said arm and provided with idlers or rollers at opposite sides of one part of the said belt, and gearing attached to the said arm and lever for turning the latter to tighten the belt by the said idlers, substantially as set forth.

10. In combination with a belt and its pulleys, an arm attached to a fixed support, a lever fulcrumed to the said arm and provided at its fulcrum and at its free end, respectively, with idlers or rollers, said idlers engaging opposite sides of one part of the said belt, and gearing attached to the said arm and lever for turning the latter to tighten the belt by the said idlers, substantially as set forth.

11. In combination with a belt and its pulleys, an arm attached to one of the pulley-shafts, a lever fulcrumed to the said arm and provided with idlers or rollers, gearing attached to the said arm and lever for turning the latter to tighten the belt by the said idlers, and a counter-weight balancing the pressure exerted on the belt by the weight of the said arm, lever, idlers, and their connecting-gears, substantially as set forth.

In testimony that I claim the foregoing as my invention I have signed my name, in presence of two witnesses, this 19th day of July, 1887.

GEORGE ROSQUIST.

Witnesses:
A. W. ALMQVIST,
MAURICE LINDBLADZ.